United States Patent [19]

Ikesue

[11] 4,260,118
[45] * Apr. 7, 1981

[54] SEAT BELT RETRACTOR

[75] Inventor: Haruyuki Ikesue, Fujisawa, Japan

[73] Assignee: NSK-Warner K.K., Tokyo, Japan

[ * ] Notice: The portion of the term of this patent subsequent to Nov. 18, 1997, has been disclaimed.

[21] Appl. No.: 79,364

[22] Filed: Sep. 27, 1979

[30] Foreign Application Priority Data

Oct. 4, 1978 [JP] Japan .......................... 53/136487[U]

[51] Int. Cl.³ ........................ A62B 35/02; B65H 75/48
[52] U.S. Cl. ............................. 242/107.4 A; 280/803; 280/806
[58] Field of Search .................. 242/107.4 R–107.4 E; 280/801–808; 297/469, 475–480

[56] References Cited

U.S. PATENT DOCUMENTS

| 4,040,645 | 8/1977 | Giffen et al. | 280/803 |
| 4,083,581 | 4/1978 | Clifford | 280/803 |
| 4,090,735 | 5/1978 | Czernakowski | 297/477 |

Primary Examiner—John M. Jillions
Attorney, Agent, or Firm—Shapiro and Shapiro

[57] ABSTRACT

A retractor for seat belt provided with an emergency locking mechanism is disclosed. The retractor comprises a webbing taking-up means, an inertia sensing means, a locking means and an operating means. The inertia sensing means directly senses by means of inertia a change in speed of vehicle when the change of vehicle speed exceeds a predetermined level. When the inertia sensing means senses such change of vehicle speed beyond the predetermined level, the locking means interlocked with the inertia sensing means is brought into operation to lock the pulling out of the webbing from the webbing take-up means. The operating means is movable between a first position in which it allows a free movement of the locking means and a second position in which it restrains the movement of the locking means. When there is no need for emergency locking, the operating means is held in its second position by an external order issued from the outside of the retractor.

2 Claims, 12 Drawing Figures

SEAT BELT RETRACTOR

BACKGROUND OF THE INVENTION

1. Field of the Invention

This invention relates to a device for rendering an emergency-lock mechanism when lock is unnecessary in a retractor provided with an emergency-lock mechanism in a safety seat belt system for a vehicle.

2. Description of the Prior Art

Numerous safety seat belt systems for vehicle in which, during normal running of the vehicle, the draw-out and withdrawal of webbing from a retractor is kept free and during a sudden variation in speed of the vehicle body resulting from collision or the like, the draw-out of the webbing is locked to restrain a seat occupant have been proposed and put into practical use. In such an emergency-lock mechanism, two types of means for sensing a sudden variation in speed of the vehicle body resulting from collision or the like have been used, namely, the webbing draw-out acceleration sensing type which senses a variation in draw-out speed of the webbing and the vehicle body acceleration sensing type which directly senses a variation in speed of the vehicle body. In case of a retractor provided with an emergency-lock mechanism of the former type, namely, of the webbing draw-out acceleration sensing type, the emergency-lock mechanism works even when the webbing is rapidly drawn out during the wearing of the seat belt, thus making it difficult to manipulate the webbing and for this reason, a mechanism for rendering the emergency-lock mechanism inoperative by energizing an electromagnet or the like when emergency-lock is unnecessary has already been proposed. However, in case of a retractor provided with an emergency-lock mechanism of the latter type, namely, of the vehicle body acceleration sensing type, it has not posed so great a problem to render the emergency-lock mechanism inoperative. This is because the retractor has heretofore been attached to the vehicle body. However, in case of the passive safety seat belt system whereby the seat occupant is caused to wear the safety seat belt independently of his or her will, it becomes necessary to attach the retractor to a movable portion of the vehicle body such as the door or the like and the emergency-lock mechanism may undesirably operate during the movement of such movable portion.

SUMMARY OF THE INVENTION

It is the object of the present invention to provide a device inoperative when emergency-lock is unnecessary which can render an emergency lock mechanism of the vehicle body acceleration sensing type inoperative by manual operation or automatically when desired.

The invention will become fully apparent from the following detailed description of a preferred embodiment thereof taken in conjunction with the accompanying drawings.

DESCRIPTION OF THE PREFERRED EMBODIMENTS

Figure 1:
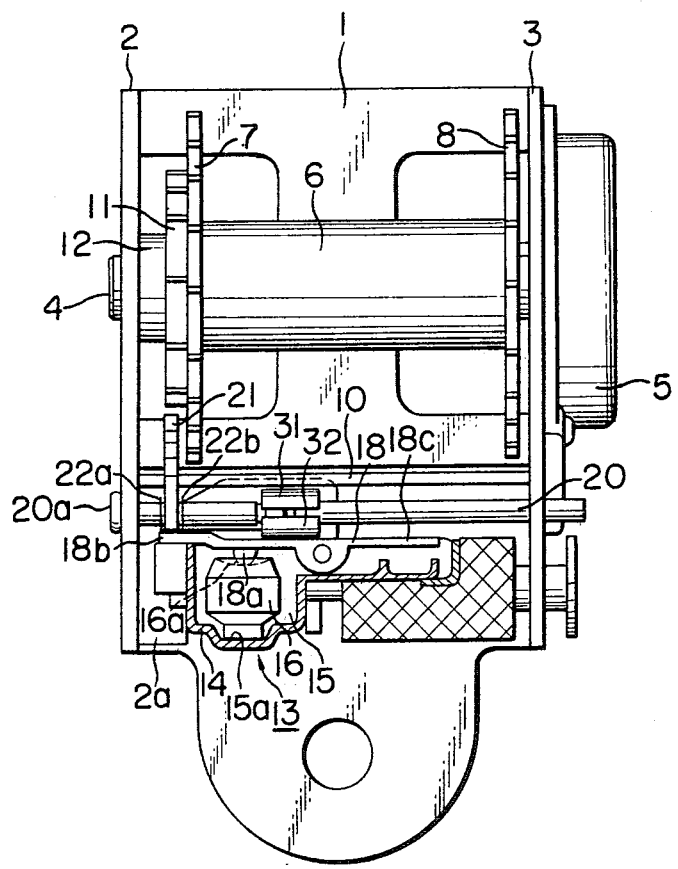
FIG. 1 is a partly cut-away front view showing a preferred embodiment of the present invention.

Referring to FIG. 1, parallel side plates 2 and 3 are integrally formed with the base 1 of a retractor for a safety seat belt system, and a take-up shaft 4 is rotatably supported substantially at the center portions of the side plates 2 and 3. A take-up spring (not shown) is provided on the take-up shaft 4 at the right end thereof as viewed in FIG. 1 and biases the take-up shaft 4 in a direction to take up webbing. Designated by reference character 5 is a spring cover for containing therein the take-up spring, the cover 5 being secured to the base side plate 3. Between the base side plates 2 and 3, a webbing take-up spool 6 extends and the flanges 7 and 8 are attached integrally to the take-up shaft. The spool and flanges form a take-up reel. The peripheral edges of the flanges 7 and 8 are formed with ratchet gears and, when a lock member 10 to be described meshes with the ratchet gears, it may prevent the rotation of the take-up reel in the webbing draw-out direction to thereby prevent draw-out of the webbing (not shown). An auxiliary ratchet gear 11 having a diameter smaller than that of the flange 7 is provided on the take-up shaft 4 adjacent to the flange 7. The number of teeth of the ratchet gears of the flanges 7 and 8 and the number of teeth of the auxiliary ratchet gear are selected to be the same. Between the base side plate 2 and the auxiliary ratchet gear 11, a cylindrical spacer 12 is loosely fitted on the take-up shaft 4.

Figure 4A:
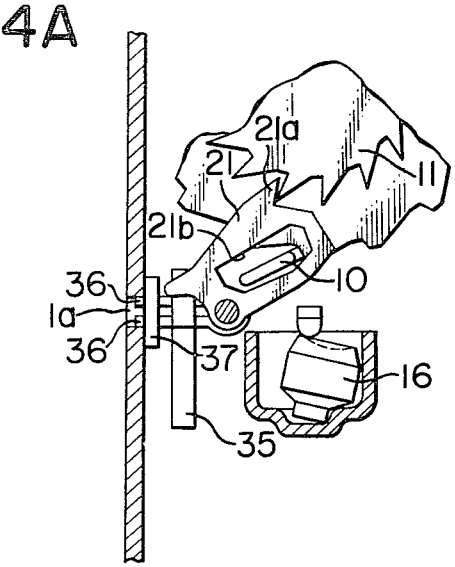
FIGS. 4A and 4B illustrate the emergency-locked condition of the embodiment.

A supporting projection 2a is integrally formed with the inner side of the lower edge of the base side plate 2, and a case 14 for vehicle body acceleration sensing means 13 is secured to the projection 2a. The case 14 has a chamber 15 and an inertia sensing member 16 is placed on the flat bottom surface 15a of the chamber. The inertia sensing member 16 is normally in upright position as shown in FIG. 1, but when it is subjected to a force resulting from a variation in speed of the vehicle body, it is tilted as shown in FIG. 4A and when it becomes free of such force, it returns to its original position, as is well-known. In the present embodiment, the inertia sensing member is of the upright type, but this may of course be replaced by other type of inertia sensing member such as a pendulum, a ball or the like. The top of the inertia sensing member 16 is formed with a shallow recess 16a, on which is placed the downwardly facing projection 18a of a lever 18 pivotally supported on the central upper portion of the case. The lever 18 is pivotable about its pivot clockwisely as viewed in FIG. 1 when the inertia sensing member 16 is tilted, and has an end portion 18b extending toward the base side plate 2 and below the aforementioned auxiliary ratchet gear 11 and the spacer 12. If the lever 18 is so formed as to have a portion 18c extending in the opposite direction from the pivot point, namely, toward the base side plate 3, it will more sensitively respond to the tilting of the inertia sensing member 16.

Figure 3A:
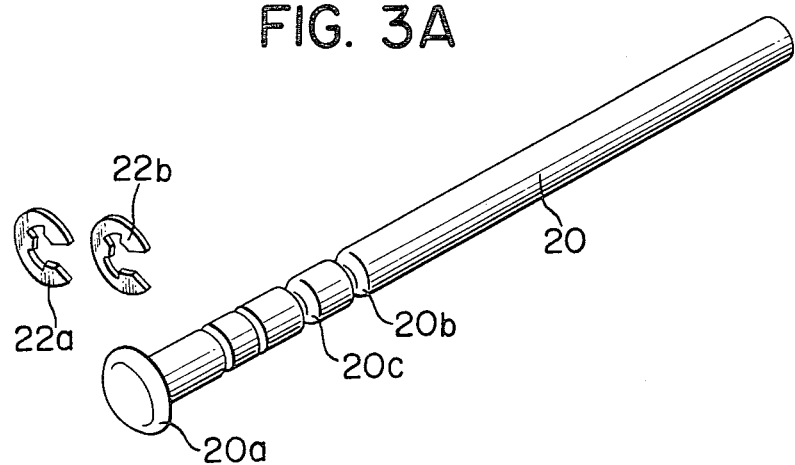
FIG. 3A is an exploded perspective view of the essential portions of the embodiment.

Slightly above the lever 18, a bar member 20 is axially movably bridged with respect to the side plates 2 and 3. On this bar member 20, a ratchet lever 21 which is an auxiliary lock member is loosely fitted below the auxiliary ratchet gear 11 for pivotal movement with respect to the bar member 20 but against axial sliding movement by snap rings 22a and 22b. That portion of the bar member 20 which is projected outwardly of the side plate 2 is formed as an enlarged diameter portion 20a. In its free state, the ratchet lever 21 has the lower edge thereof resting on the end portion 18b of the lever 18 due to its own gravity, as shown in FIG. 3 and as the lever 18 is pivoted to raise its portion 18b, the ratchet lever 21 is pivotable about the bar member 20. The upper portion of the lever 21 is formed with a ratchet tooth 21a which may mesh with the auxiliary ratchet gear 11 during the pivotal movement of the lever 21. Substantially centrally of the ratchet lever 21, an axially open hole 21b is formed, and the lock member 10 resting in sector holes (not shown) formed in opposed relationship with the base side plates 2 and 3 extends through the hole 21b with a suitable allowance. The lock member 10 is normally in non-mesh engagement with the outer peripheral ratchet gears of the flanges 7 and 8 of the take-up reel from gravity and/or due to a spring (not shown) disposed between the lock member and the base side plate 2 or 3, but when it is pivoted within the sector holes into mesh engagement with the ratchet gears of the flanges 7 and 8, the lock member stops the rotation of the take-up reel in the webbing draw-out direction to thereby prevent the draw-out of the webbing, as already noted.

With such a construction, when the inertia sensing member 16 is tilted by sensing sudden variation in speed resulting from collision of the vehicle body or sudden braking, the lever 18 is pivotally moved about its pivot so that the end portion 18b thereof pivots the ratchet lever 21 about the bar member 20 to bring the ratchet tooth 21a into mesh engagement with the auxiliary ratchet 11. On the other hand, at this time, the seat belt wearer leans forwardly due to the sudden variation in speed and therefore, the webbing is drawn out to rotate the take-up shaft and the take-up reel in the webbing draw-out direction. The auxiliary ratchet gear 11 secured to the take-up shaft comes into mesh engagement with the ratchet tooth 21a of the ratchet lever 21 to further rotate the ratchet lever 21 and thereby, the lock member 10 extending through the hole 21b in the ratchet lever 21 is also rotated and the lock member comes into mesh engagement with the ratchet gears of the flanges 7 and 8 of the take-up reel to lock the rotation of the take-up reel and the take-up shaft integral therewith and prevent the draw-out of the webbing, thus restraining the seat belt wearer.

Figure 3B:
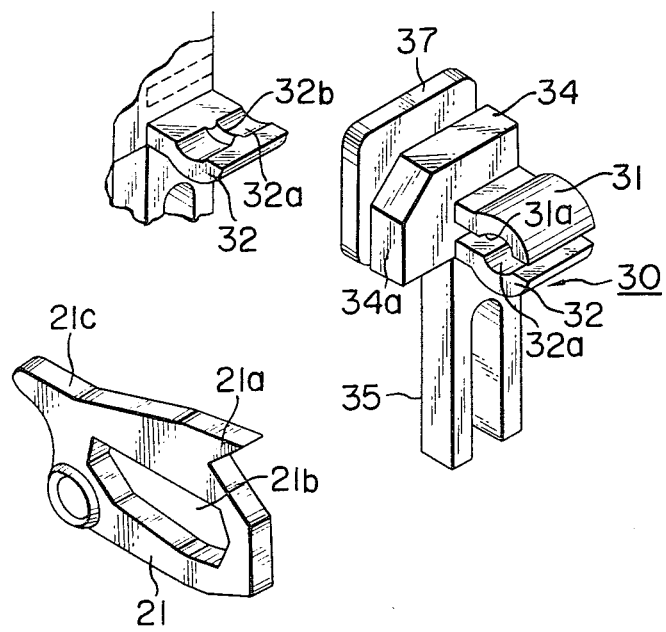
FIG. 3B is a partial illustration of the operating member shown in FIG. 3A.

On the other hand, an operating member 30 (which is shown as a perspective view in FIG. 3) is axially slidably supported on the bar member 20 and may be driven manually or by other appropriate driving means which will later be described. More particularly, the operating member 30 has a pair of opposed guide members 31 and 32 clearance-fitted so as to embrace the bar member 20 therebetween, and the opposed sides of these guide members are formed with axial recesses 31a and 32a each having a diameter substantially equal to the outer diameter of the bar member. The axially central portions of these recesses 31a and 32a are provided with circumferential projections 31b and 32b extending in the circumferential direction, namely, in the direction perpendicular to the axial direction. In FIG. 3B, only the circumferential projection 32b is shown. On the other hand, the bar member 20 is formed with first and second circumferential grooves 20b and 20c at a predetermined interval relatively near the ratchet lever 21 attached to the bar member, so that the projections 31b and 32b of the guide members snap into these circumferential grooves to locate a guide member 33 with respect to the bar member 20.

The operating member 30 has a cam member 34 integral with the guide members 31 and 32. The cam member 34 has a cam surface 34a which, when the inner projections 31b and 32b of the guide member 31 engage the second circumferential groove 20c of the bar member 30, contacts the lower side of the upper protrusion 21c forming the rear end of the ratchet lever 21 to raise the protrusion 21c to thereby pivot the ratchet lever 21 to a position in which it cannot mesh with the auxiliary ratchet gear 11, thus holding the ratchet lever 21 in such position. A downwardly facing operating portion 35 is formed integrally with the cam member 34 of the operating member 30. In the present embodiment, as shown in FIG. 2, a driving member 41 axially movable by a driving solenoid 40 is connected to the operating portion 35, so that the operating member 30 is moved on the bar member 20 by ON-OFF of the solenoid 40 through the driving member 41.

To prevent the operating member 30 from being rotated about the bar member 20, as shown in FIG. 4A, an extended guide portion 36 is provided on that side of the cam member 34 which faces the base 1, and the end of the extended guide portion 36 is fitted in a slot 1a formed in the base 1 and parallel to the bar member 20. A contact plate portion 37 which substantially contacts the surface of the base 1 is formed integrally with the extended guide portion 36 to prevent back-lash of the operating member 30 and enable the operating member 30 to stably move along the bar member 20.

Figure 4B:
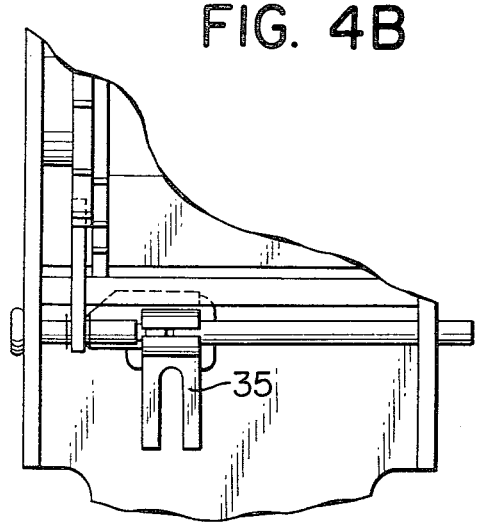

Operation of the present embodiment will now be described. FIGS. 1 and 2 show the condition in which emergency lock is possible and at this time, the inward projections 31b and 32b of the guide members 31 and 32 of the operating member 30 are in engagement with the first circumferential groove 20b of the bar member 20. In this position, the ratchet lever 21 is independent of the operating member 30 and the lower end of the ratchet lever 21 normally rests on the extended end portion 18b of the lever 18 which is adjacent to the inertia means 13, due to gravity. When a sudden variation in speed occurs to the vehicle to tilt the inertia member 16 as shown in FIG. 4A, the lever 18 is pivotally moved about its pivot and the extended end portion 18b causes the ratchet lever 21 to pivot about the bar member 20, so that the ratchet tooth 21a becomes engageable with the auxiliary ratchet gear 11 on the take-up reel side. At this time, the seat belt wearer leans forwardly due to the variation in speed of the vehicle to draw out the webbing, so that the take-up means and the auxiliary ratchet gear 11 are rapidly rotated and mesh with the ratchet tooth 21a of the ratchet lever, thus causing the ratchet lever 21 to further pivot about the bar member 20. Accordingly, the lock member 10 meshes with the main ratchet gears 7 and 8 to prevent rotation of the take-up means. This is the emergency-locked condition. FIGS. 4A and 4B show such condition.

Figure 2:
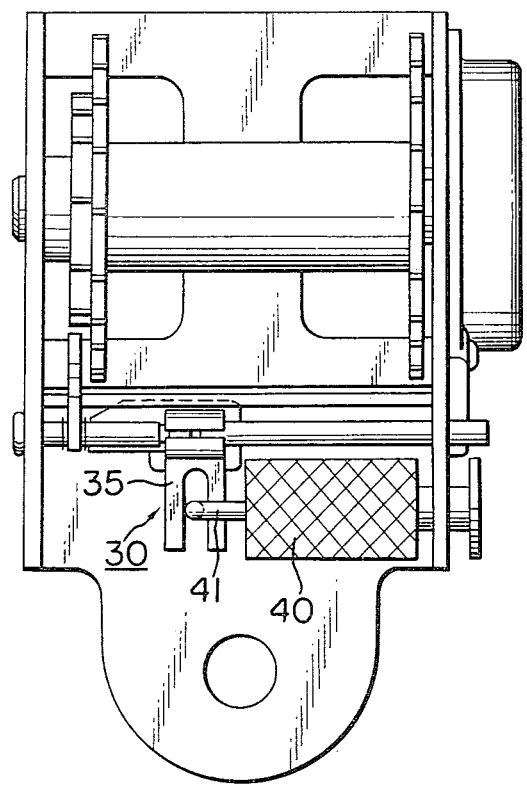
FIG. 2 is a front view of the embodiment with the inertia sensing mechanism portion removed.
Figure 5A:
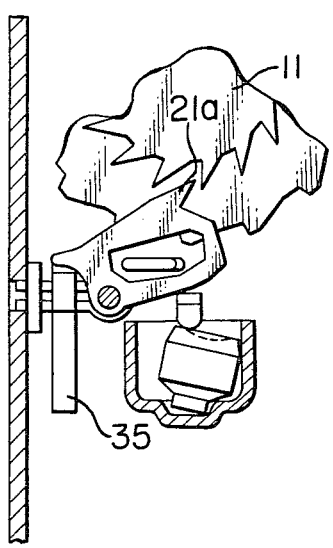
FIGS. 5A and 5B illustrate a condition in which the emergency-lock mechanism is being rendered inoperative.
Figure 5B:
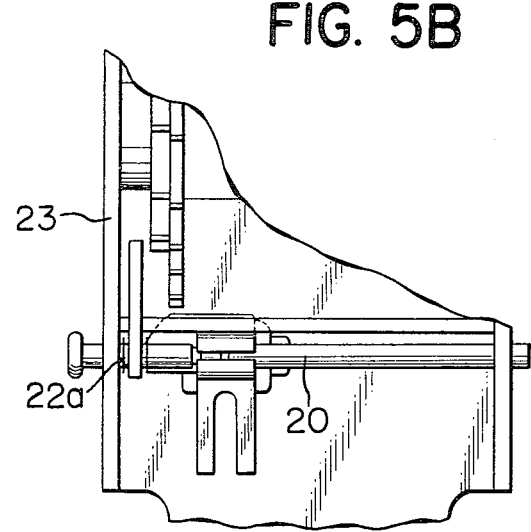

When, from this emergency-locked condition or from the emergency-lockable condition as shown in FIGS. 1 and 2, the operating member 30 is moved on the bar member 20 toward the base side plate 2 by operating the solenoid 40 in response to the opening-closing of the door or by manual operation or other extraneous force, the bar member 20 is also moved because the projections 31b and 32b of the operating member 30 are engaged with the first circumferential groove 20b of the bar member 20 as shown in FIGS. 5A and 5B, and accordingly, the ratchet lever 21 is also moved axially and thus, the ratchet lever 21 is deviated from the plane on which the auxiliary ratchet gear 11 lies, so that the two become unengageable.

When the bar member 20 is axially moved over a predetermined distance, the snap ring 22a of the bar member 20 comes into contact with the base side plate 23 to prevent further movement of the bar member 20.

Figure 6A:
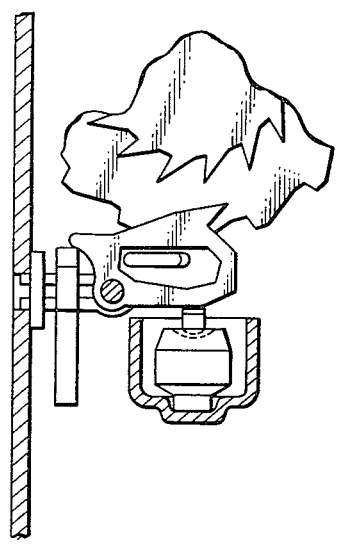
FIGS. 6A and 6B illustrate a condition in which the emergency-lock mechanism has been rendered completely inoperative.
Figure 6B:
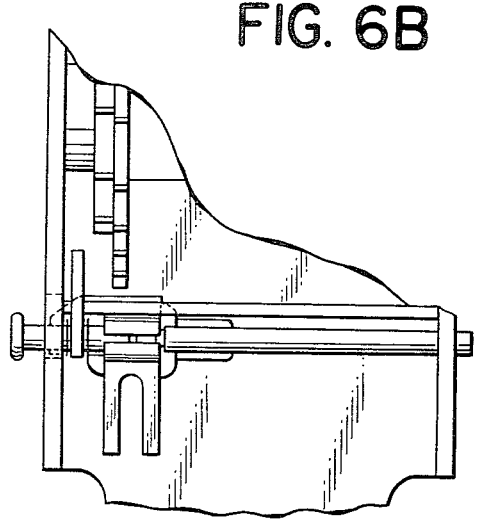

Here, when the driving force toward the base side plate 2 is imparted to the operating means 30 by the solenoid 40 or other extraneous force, the operating member 30 becomes disengaged from the first circumferential groove 20b of the bar member and moves on the bar member 20 toward the base side plate 2 because the movement of the bar member 20 is blocked by the snap ring 22a. Accordingly, the cam surface 34a of the operating member 30 comes into contact with the upper extended portion 21c forming the rear end of the ratchet lever 21 to raise this extended portion 21c upwardly and cause the ratchet lever 21 to pivot about the bar member 20, thus preventing the inertia member 16 from moving through the lever 18. In this condition, the inward projections 31b and 32b of the guide member of the operating member 30 come into engagement with the second circumferential groove 20c of the bar member 20 and maintains this state. This corresponds to FIGS. 6A and 6B.

Figure 7A:
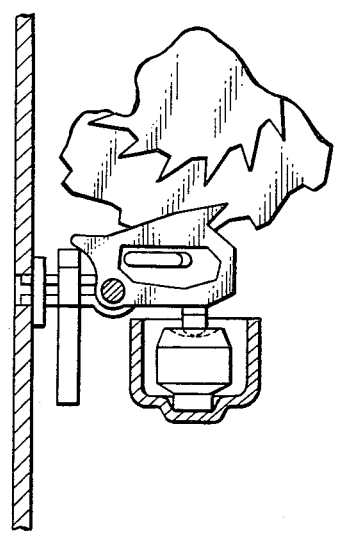
FIGS. 7A and 7B illustrate a condition in which the emergency-lock mechanism is being again rendered operative.
Figure 7B:
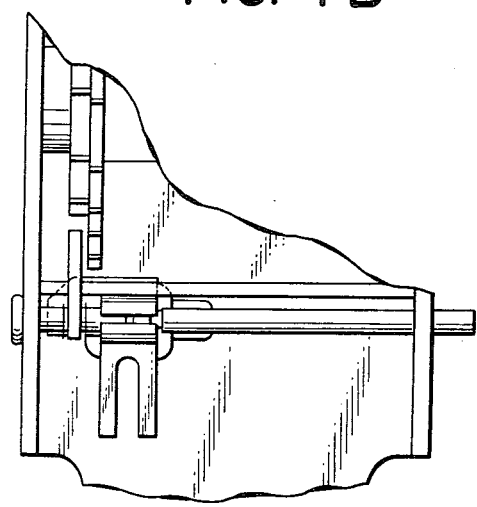

Subsequently, the solenoid 40 is operated in response to the door and the operating member 30 is moved in the opposite direction by an extraneous force such as manual operation, whereupon the ratchet lever 21 is returned to its axial start position while remaining restrained by the cam member 34 of the operating means 30 (FIGS. 7A and 7B) because the guide members 31 and 32 of the operating member are then in engagement with the second circumferential groove 20c of the bar member 20. Since the ratchet lever is restrained, by the cam member 34, in a position in which it cannot mesh with the ratchet gear 11, it returns to the position of FIG. 1 without being hampered by the auxiliary ratchet gear 11. The operating member 30 is continuedly subjected to the drive force by the solenoid 40 or other extraneous force. However, the bar member 20 has its enlarged portion 20a in contact with the base side plate 2 and its further movement is blocked. Therefore, the engagement between the guide members 31, 32 of the operating means 30 and the second circumferential groove 20c is released to permit the operating member 30 to be axially moved on the bar member 20 into engagement with the first circumferential groove 20b, whereupon the operating member is stopped. By this movement, the ratchet lever 21 is liberated from the cam member 34 and becomes pivotable on the bar member 20. Thus, the retractor again becomes emergency-lockable. That is, the state of FIGS. 1 and 2 is restored. If design is so made that the release of the restraint on the ratchet lever 21 may take place after the ratchet lever has returned to the same plane as the auxiliary ratchet gear 11, there is an advantage that, during the return to its initial position, the inertia sensing member performs no malfunctioning while remaining restrained in its upright condition and the ratchet lever 21 does not collide against the auxiliary ratchet gear during its return.

I claim:

1. A mechanism for making an emergency-lock mechanism in a retractor inoperative when emergency-lock is unnecessary, having webbing take-up means having a main gear and an auxiliary gear, inertia sensing means for directly sensing a predetermined variation in speed of a vehicle body by an inertia, an auxiliary lock member capable of assuming a first pivoted position, an intermediate pivoted position and a second pivoted position in the same plane in response to said inertia sensing means, said auxiliary lock member when in said first pivoted position being incapable of meshing with said auxiliary gear, said auxiliary lock member when lying in the same plane as said auxiliary gear being capable of meshing with said auxiliary gear in its said intermediate pivoted position, said auxiliary lock member when meshing with said auxiliary gear in said intermediate pivoted position being brought from said intermediate pivoted position to said second pivoted position by the rotation of said take-up means, and a main lock member normally being in a non-meshing position with said main gear but adapted to come into a meshing position with said main gear in response to the movement of said auxiliary lock member from said intermediate pivoted position to said second pivoted position and mesh with said main gear to prevent draw-out of webbing, the improvement residing in:

that said auxiliary lock member can assume a first axial position on a plane in which said auxiliary gear lies and a second axial position axially spaced apart from said plane and in which said auxiliary lock member cannot mesh with said auxiliary gear;

that a support member for supporting said auxiliary lock member is provided, said support member pivotally supporting said auxiliary lock member so as to be capable of assuming said three pivoted positions and being axially movable to move said auxiliary lock member between said first axial position and said second axial position; and that operating means for moving said support member is provided, said operating means including an operating member capable of assuming two positions with respect to said support member, said operating member when in its first or second position with respect to said support member being capable of moving said support member, said operating member when in its second position holding said auxiliary lock member in its first pivoted position.

2. A mechanism according to claim 1, wherein said operating member is snap-coupled to said support member and has a first and a second snap-coupled position, said operating member when in said first or second snap-coupled position can move said support member, and said operating member when in said second snap-coupled position holds said auxiliary lock member in said first pivoted position.

* * * * *